(12) United States Patent
Jenkins

(10) Patent No.: US 11,618,138 B2
(45) Date of Patent: Apr. 4, 2023

(54) RELEASE MECHANISM FOR A TORQUE TOOL

(71) Applicant: STAHLWILLE Eduard Wille GmbH & Co. KG, Wuppertal (DE)

(72) Inventor: Brad Jenkins, Monrovia, CA (US)

(73) Assignee: STAHLWILLE Eduard Wille GmbH & Co. KG, Wuppertal (DE)

(*) Notice: Subject to any disclaimer, the term of this patent is extended or adjusted under 35 U.S.C. 154(b) by 105 days.

(21) Appl. No.: 16/961,290

(22) PCT Filed: Jan. 3, 2019

(86) PCT No.: PCT/DE2019/100000
§ 371 (c)(1),
(2) Date: Jul. 10, 2020

(87) PCT Pub. No.: WO2019/137577
PCT Pub. Date: Jul. 18, 2019

(65) Prior Publication Data
US 2020/0398409 A1   Dec. 24, 2020

(30) Foreign Application Priority Data

Jan. 12, 2018  (DE) .................... 10 2018 100 665.9

(51) Int. Cl.
*B25B 23/14* (2006.01)
*B25B 23/142* (2006.01)

(52) U.S. Cl.
CPC ........ *B25B 23/141* (2013.01); *B25B 23/1425* (2013.01); *B25B 23/1427* (2013.01)

(58) Field of Classification Search
CPC .............. B25B 23/1425; B25B 23/141; B25B 23/1427; F16D 7/10; F16D 43/208; F16D 15/00; F16D 27/118
(Continued)

(56) References Cited

U.S. PATENT DOCUMENTS

| 1,807,914 | A | * | 6/1931 | Hopkins | ............... | B66F 13/005 |
| | | | | | | 254/98 |
| 2,651,454 | A | * | 9/1953 | Bjurstrom | ............. | F04B 33/005 |
| | | | | | | 92/163 |

(Continued)

FOREIGN PATENT DOCUMENTS

| CN | 1036162 A | 10/1989 |
| CN | 2181374 | 11/1994 |

(Continued)

OTHER PUBLICATIONS

Jenkins et al., co-pending U.S. Appl. No. 16/961,275.
(Continued)

*Primary Examiner* — Joseph J Hail
*Assistant Examiner* — Robert C Moore
(74) *Attorney, Agent, or Firm* — Smartpat PLC

(57) ABSTRACT

A release mechanism for an electronically triggered torque tool to tighten a screw or a similar fastener triggers at a target torque. The release mechanism comprises a drive body and a main body, which rotate around a common axis to transfer a torque. A locking mechanism couples the drive body and the main body to transfer a torque. Measuring and evaluating means to measure and evaluate the torque transferred are provided, whereby a signaling device activates the locking mechanism to decouple the drive body from the main body upon reaching a target torque.

5 Claims, 6 Drawing Sheets

(58) Field of Classification Search
USPC .............. 81/469, 475, 474; 74/500.5, 502.3
See application file for complete search history.

(56) References Cited

U.S. PATENT DOCUMENTS

| | | | | |
|---|---|---|---|---|
| 2,869,377 | A * | 1/1959 | Pieterse | .................... F16C 1/20 |
| | | | | 74/502 |
| 2,926,537 | A * | 3/1960 | Pieterse | ............. F16C 33/3706 |
| | | | | 74/216.3 |
| 3,665,601 | A * | 5/1972 | Dunbabin | ............ H01R 24/545 |
| | | | | 29/451 |
| 3,693,381 | A * | 9/1972 | McGee | ................. B25B 23/145 |
| | | | | 81/474 |
| 3,965,802 | A * | 6/1976 | Jacobs | .................. B66F 13/005 |
| | | | | 254/93 VA |
| 4,898,068 | A | 2/1990 | Neuhaus | |
| 5,082,066 | A | 1/1992 | Schoeps | |
| 5,203,242 | A | 4/1993 | Hansson | |
| 5,488,881 | A * | 2/1996 | Lin | ........................ F16H 49/00 |
| | | | | 464/178 |
| 6,042,298 | A * | 3/2000 | Mastrogiannis | ...... E06B 3/9725 |
| | | | | 403/231 |
| 6,119,562 | A * | 9/2000 | Jenkins | ............... B25B 23/1427 |
| | | | | 81/479 |
| 7,458,297 | B1 * | 12/2008 | Shiao | .................. B25B 23/1425 |
| | | | | 81/479 |
| 8,683,883 | B2 * | 4/2014 | Kraft | .................... F16H 19/0622 |
| | | | | 74/89.21 |
| 2001/0004940 | A1 | 6/2001 | Hansson | |
| 2003/0196497 | A1 * | 10/2003 | Geilenbrugge | ......... G01L 3/108 |
| | | | | 73/862.338 |
| 2006/0124332 | A1 | 6/2006 | Greese et al. | |
| 2006/0225519 | A1 | 10/2006 | Nakagawa et al. | |
| 2007/0051186 | A1 * | 3/2007 | Gharib | ................ B25B 23/1427 |
| | | | | 73/862.21 |
| 2007/0227316 | A1 | 10/2007 | Lucke et al. | |
| 2007/0261868 | A1 | 11/2007 | Gross | |
| 2009/0255386 | A1 * | 10/2009 | Liao | .................... B25B 23/1427 |
| | | | | 81/124.5 |
| 2011/0315414 | A1 | 12/2011 | Kuntner et al. | |
| 2015/0328756 | A1 | 11/2015 | Ho et al. | |
| 2016/0151828 | A1 | 6/2016 | Weyland | |
| 2016/0236335 | A1 * | 8/2016 | Hsieh | ...................... B25B 15/04 |
| 2017/0021484 | A1 | 1/2017 | Szewc et al. | |
| 2020/0398409 | A1 | 12/2020 | Jenkins | |
| 2021/0069879 | A1 | 3/2021 | Jenkins et al. | |

FOREIGN PATENT DOCUMENTS

| | | |
|---|---|---|
| CN | 2493358 | 5/2002 |
| CN | 1843705 A | 10/2006 |
| CN | 101041234 A | 9/2007 |
| CN | 103586823 A | 2/2014 |
| CN | 105643258 A | 6/2016 |
| CN | 106457492 A | 2/2017 |
| DE | 19507097 A1 | 9/1996 |
| DE | 69118733 | 11/1996 |
| DE | 19912837 A1 | 10/2000 |
| DE | 10051011 A1 | 4/2002 |
| DE | 102004059814 A1 | 6/2006 |
| DE | 202006008056 U1 | 8/2006 |
| DE | 102006013147 A1 | 9/2007 |
| DE | 202007015971 U1 | 1/2008 |
| DE | 102007059965 A1 | 6/2009 |
| DE | 60038357 | 7/2009 |
| DE | 202011050280 U1 | 9/2011 |
| DE | 102010030410 A1 | 12/2011 |
| DE | 202014000041 U1 | 4/2014 |
| EP | 2777883 A1 | 9/2014 |
| FR | 3010341 A1 | 3/2015 |
| FR | 3034033 A1 | 9/2016 |
| JP | S5376298 U | 6/1978 |
| TW | M289822 U | 4/2006 |

OTHER PUBLICATIONS

Japanese Patent Office, Notice of Reasons for Refusal in related Japanese Patent Application No. 2020-538550, dated Aug. 15, 2022.

* cited by examiner

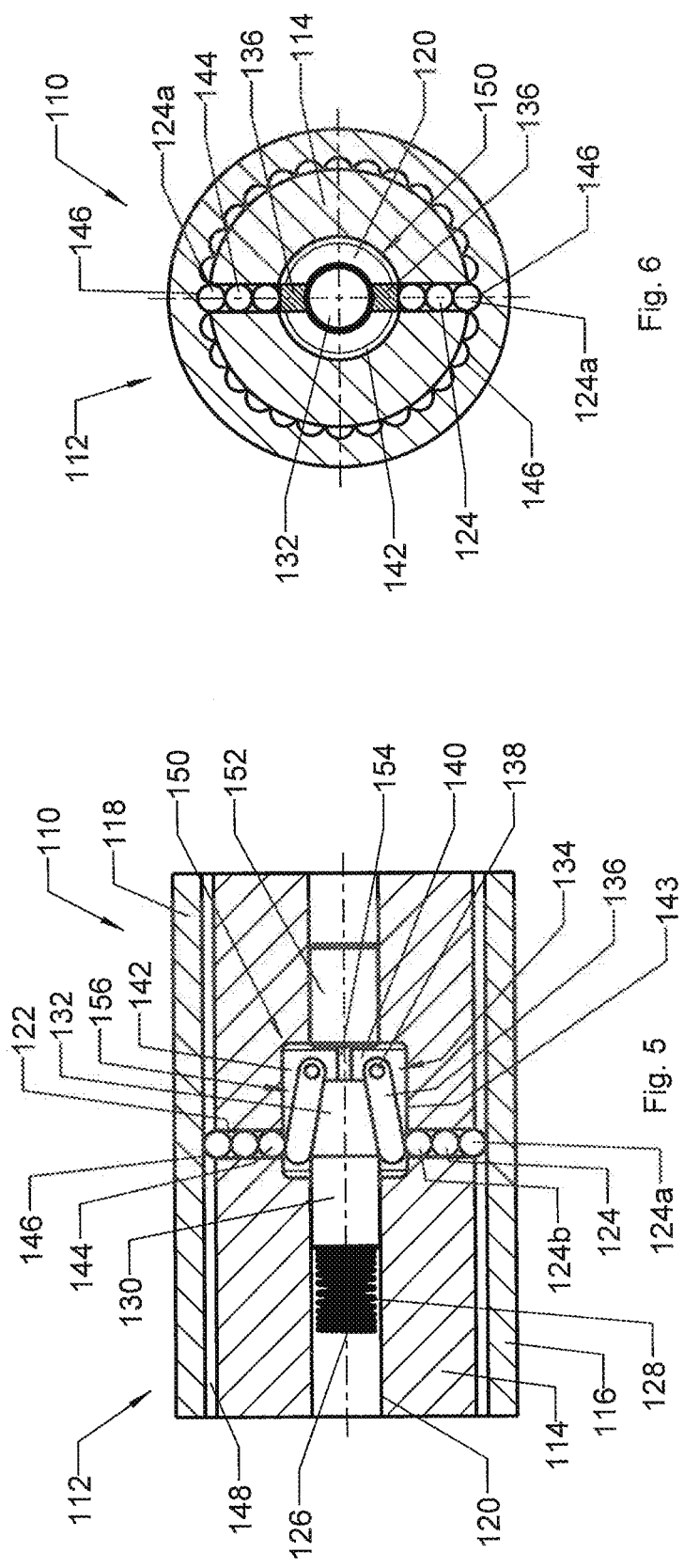

RELEASE MECHANISM FOR A TORQUE TOOL

TECHNICAL FIELD

The invention relates to a release mechanism for an electronically triggered torque tool to tighten a screw or a similar fastener, which triggers at a target torque.

BACKGROUND

Screw connections are the most commonly used connections in mechanical engineering. Such connection elements can only be effective through the use of suitable assembly tools. Assembly tools suitable for this purpose include torque tools like the torque screwdriver.

Torque tools are needed to achieve a specific torque on a workpiece. Torque wrenches and torque screwdrivers are commonly known torque tools, for example. There are mechanical and electronic torque tools. In particular, there are indicating torque tools and setting torque tools. Indicating torque tools always show the current torque of a connection. A target torque value is set on setting torque tools. As soon as this torque is reached when tightening a threaded connection, the torque tool signals the user that the target torque has been reached. This can be signaled by an audible click or a noticeable deflection of the tool. The release mechanism can be designed in various ways. For example, such a mechanism, upon reaching the target torque, can prevent the transfer of a torque to the workpiece that is higher than the target torque setting.

The torque to be transferred when using manually operated tools depends on the physical condition of the user as well as on their subjective sensitivity to force. Torque tools are used to tighten a screw or bolt using a high tightening force that lies within the elastic range of the screw or bolt to ensure the screw is only tightened with a minimal tightening force. The use of new construction materials like magnesium, aluminum, or plastic in lightweight designs in the automobile or aviation industries, for example, is increasing the demand for torque tools as well as the requirements placed on torque tools. Due to these new materials, the number of sensitive threaded connections is increasing. The low tensile strength of these lightweight design materials as compared to steels leads to damaged threads on the threaded connection if tightened too tightly, which then renders these expensive components useless.

Known signaling torque tools have a particular disadvantage in that they only indicate the target torque. The transfer of the torque to a workpiece is not interrupted. Such interrupting torque tools are generally difficult to manufacture and complicated to assemble, and are thus very cost-intensive to produce.

A multifunctional pneumatic tool is known from DE 20 2007 015 971 U1. The multifunctional pneumatic tool comprises a base body, on which an operating lever, an inlet connection, and a cylinder are arranged. A rotor with blades is arranged inside the cylinder. The cylinder is connected to the inlet connection through an inlet switch. The inlet switch can be controlled by the operating lever. A rotary shaft of the rotor passes through the cylinder. The tool additionally comprises at least two tool heads with different functions. A connection element is arranged on the rear end of each tool head, and a connection device is arranged on the front end of the base body. The connection element of a given tool head is releasably connected to the connection device on the front end of the base body. The rear end of the connection element is releasably connected to the front end of the rotor. The releasable connection of the connection element arranged on the rear end of the tool head to the front end of the rotor ensures that a torque is transferred to the individual tool heads when the blades rotate.

DE 20 2006 008 056 U1 contains a description of a force transfer device to transfer a torque that is smaller than an adjustable value. The force transfer device described therein is used as a socket wrench.

TW M2789822 discloses a force transfer device with an adjustable torque. The force transfer device comprises a driving means, a sleeve or flange, a wedge element, and a spring. The driving means is connected to the sleeve so that they can be moved and rotated with respect to each other. By adjusting the relative axial position of the driving means with respect to the sleeve, it is possible to set the force applied to the spring, and therefore set the maximum torque that can be transferred between the wedge element and the sleeve.

DE 20 2011 050 280 U1 describes an adjustable torque wrench with a tool drive component. The torque tool has a tube-shaped tool shaft in said component, which extends in the longitudinal direction. A handle is arranged on a first end section, which is pivot mounted on the tool shaft and can be rotated around the longitudinal axis of the tool shaft. The handle is directly or indirectly coupled to a tension unit inside the handle. Rotating the handle compresses or releases a spiral spring, and the resulting tension then sets the tightening torque to be applied. The handle also has a folding lever, which lies on the handle when it is in its resting position. A scale is arranged in a transition zone between the tool shaft and the handle which can indicate the current tightening torque setting in numerical form. The transition zone is tapered with respect to the tool shaft, whereby its cross-sectional area is reduced. A second end section of the tool shaft opposite first end section serves to couple with a tool drive component on which tools can be mounted, generally in the form of attachable tools. For this purpose, the second end section of the tool shaft, which otherwise has a circular cross-section, is flattened such that a rectangular opening is formed at the end.

From the German published patent application DE 100 51 011 A1, a setting torque wrench is known in which the torque is measured electronically. Using a strain gauge, the mechanical torque is converted to an electronic signal. The torque measured in this manner is compared to a target value. When the measured torque reaches the target torque value set or defined, the torque wrench is mechanically released at least temporarily by the electronic evaluation unit. The torque wrench is released here by decoupling the wrench handle and the wrench head, for example.

DE 20 2014 00 0041 U1 relates to a setting torque tool, which contains a shaft-like housing with a grip area and a head section. A transfer assembly is provided in the housing to transfer the torque. The torque tool also has an actuating device having an adjusting knob to set the torque at which the user desires the tool to provide a signal. A display shows the value of the torque at which the torque tool should release. The torque tool also has a release mechanism, which triggers the release of the torque tool upon reaching the previously set torque.

From DE 10 2006 013 147 A1 a torque tool for measuring and/or for tightening a torque up to a set torque on a workpiece is known. The torque tool contains a housing with a handle and a head lever to transfer the torque. A measuring element serves to measure the torque electronically, the value of which is processed by an electronic measuring and control system. An activating switch controlled by the electronic measuring and control system releases the torque tool when a target torque value is reached. The torque wrench described therein has a reduction mechanism, which has at least one actuator that is activated by the activating switch. The reduction mechanism is arranged between the lever used to transfer the torque and the electronically controlled activating switch used to release the torque tool. In this document, the description states that the reduction mechanism contains a switching lever with a switching edge that is controlled by the electronically controlled activating switch.

SUMMARY

The task of the invention is therefore to avoid the disadvantages of the current state of the art and provide a release mechanism for an electronic setting torque tool with a simple design and which is economical to manufacture. The release effect achieved should be highly effective in this regard, especially for motor-driven torque tools.

This task is achieved with a release mechanism for an electronic setting torque tool for tightening a screw or a similar fastener to a target torque. The release mechanism includes a drive body and a main body, which rotate around a common axis to transfer a torque. A locking mechanism couples the drive body and the main body to transfer a torque. Measuring and evaluating means measure and evaluate the torque transferred. A signaling device activates the locking mechanism to decouple the drive body from the main body upon reaching a target torque. The locking mechanism has a spring-loaded lever arrangement, whereby the lever arrangement couples the drive body to the main body to transfer a torque and unlocks the main body so it can move freely when released.

The mechanism is based on the principle that the drive, regardless of whether it is driven mechanically or manually, does not have any influence on the threaded connection upon reaching a target torque. The drive used to transfer a torque is decoupled upon release by decoupling the main body, which transfers the torque to a workpiece, for example with an adapter, from the drive. For this purpose, the main body is pivot-mounted on the drive and can therefore rotate freely when in the unlocked state. The main body is only coupled with the drive when locked, so that a torque up to the target torque can be transferred via the drive and the main body. The locking and unlocking of the locking mechanism can be realized particularly easily using a lever arrangement because in this case, forces can simply be redirected upon activation of the release mechanism. It is also then possible to distribute or magnify the forces applied to activate the locking mechanism, if necessary, depending on the use of the levers. The target torque to be reached can be set in this case using suitable means.

An advantageous embodiment of the release mechanism includes an electrically operated actuator which unlocks the locking mechanism upon reaching the target torque. An electrically controlled solenoid is an example of such an electrically operated actuator. Solenoids are known components and are easy to manufacture. Furthermore, it is simple to drive and operate the locking mechanism electronically in this manner with a solenoid. A suitable electrical signal is adequate for the purpose of activating the solenoid.

Another advantageous embodiment of the release mechanism is obtain in that the lever arrangement of the locking mechanism acts on a locking element, which engages a recess in the drive body to lock, and which is pulled out of the recess by means of the lever arrangement to unlock. The locking element couples the main body to the drive body. As soon as the lever arrangement can act on such a locking element, forces can be transferred to the locking element from practically any location on the torque tool via the lever arrangement. This makes it possible to achieve a reliable and secure locked state. If necessary, the locking element can also be specially hardened and theoretically can have any shape, for example that of a ball. The shape of the indentation or recess should match the shape of the locking element accordingly in this case.

An expedient and advantageous embodiment of the release mechanism is also obtained in that the lever arrangement is provided as a spring-loaded toggle lever arrangement. With the toggle lever arrangement, it is possible to realize an especially good lever arrangement for the release mechanism. The forces required to activate the release mechanism are easy to transfer using the toggle lever.

In a preferred and advantageous variant of the release mechanism, the locking element is provided in a deflection tube in the main body. In this variant, the locking elements can be optimally moved by the main body for the purpose of latching or locking. It has also proven advantageous when the locking element is then provided in the main body in a deflection tube curved at a 90° angle, which transitions from an axial direction to a radial direction.

In another advantageous embodiment of the release mechanism, an axial channel is provided in the main body in which a spring-loaded and movable plunger is arranged, which acts on a lever arrangement for the purpose of locking and which moves into the channel when released for the purpose of unlocking to create a free space for a locking element with the aid of the electrically operated actuator, for example a solenoid.

An additional advantageous embodiment of the release mechanism is obtained by providing a spring-loaded piston in a channel of the main body, on which the lever arrangement is provided with a hinged joint for locking or unlocking the locking mechanism.

Another preferred and expedient embodiment of the release mechanism is obtained in that the main body encloses an axial shaft on which a spring-loaded ring body is provided, whereby the lever arrangement used to activate the locking element is arranged on the ring body.

Additional embodiments and advantages result from the object of the subclaims and from the drawings with the associated descriptions. Exemplary embodiments are explained in more detail with reference to the enclosed drawings. The invention should not be restricted to this list of exemplary embodiments alone. They only serve to explain the invention in more detail.

BRIEF DESCRIPTION OF THE DRAWINGS

FIG. 5 is a schematic diagram of the longitudinal section along the axis of a release mechanism for a torque tool in the locked state.

FIG. 6 is a schematic diagram of the cross-section of a release mechanism for a torque tool in the locked state according to FIG. 5.

DETAILED DESCRIPTION

Figure 1:
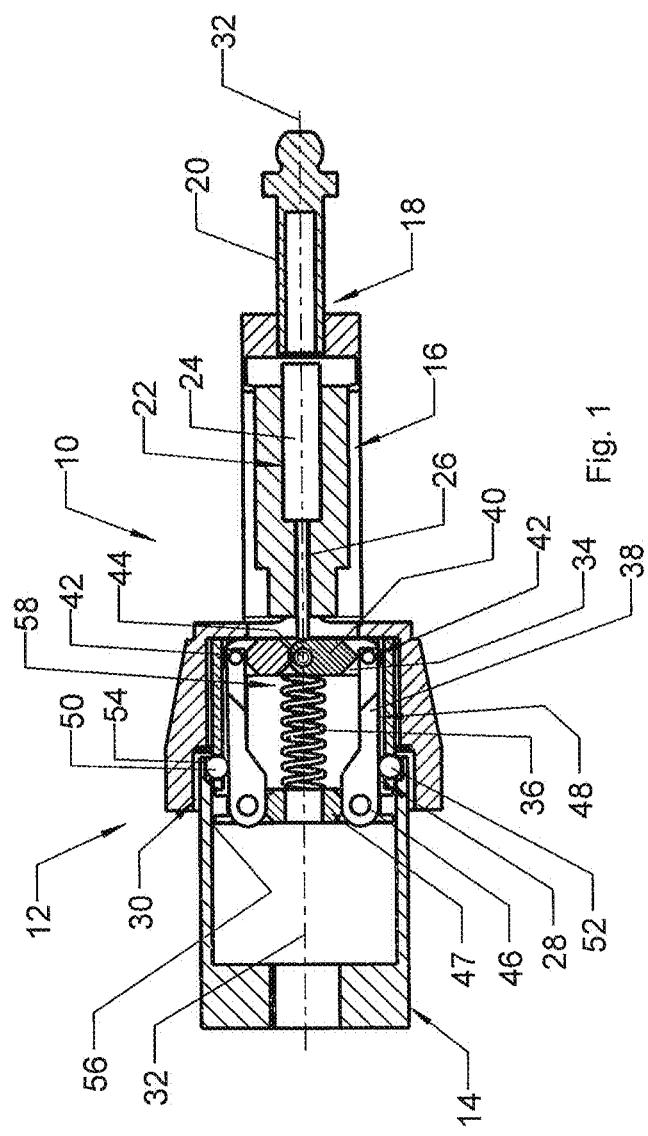
FIG. 1 is a schematic diagram of the longitudinal section along the axis of a release mechanism for a torque tool in the locked state.

In FIG. 1 the number 10 designates a release mechanism for a torque tool 12 to tighten a screw or similar fastener to a target torque. A longitudinal section of the torque tool 12 is shown in FIG. 1. The torque tool 12 comprises a cylindrical main body 14 with a housing-like drive body 16. A drive shaft 20 is attached to an area 18 of the drive body 16. The drive shaft 20 is firmly connected to the drive body 16. The drive shaft 20 can be designed as a torsion bar, for example, on which a strain gauge is provided to measure a torque to be transferred.

In a cavity 22 of the drive body 16, a solenoid 24 is provided as an electrically operated actuator. The solenoid 24 has a plunger 26. When the solenoid 24 is activated, the plunger 26 acts on a lever arrangement 28 of a locking mechanism 30, which is provided between the main body 14 and the drive body 16. The locking mechanism 30 and the solenoid 24 are components of the release mechanism 10.

Figure 2:
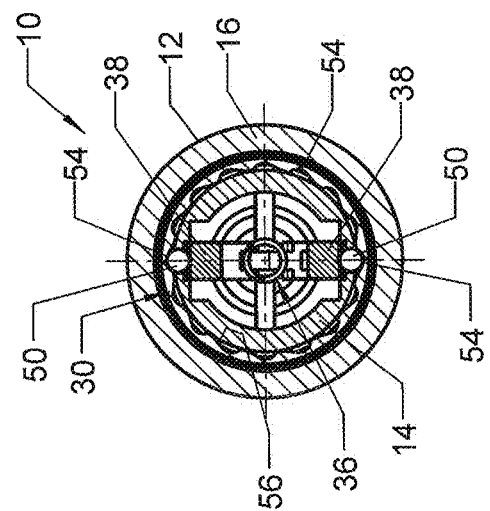
FIG. 2 is a schematic diagram of the cross-section of a release mechanism for a torque tool in the locked state according to FIG. 1.
Figure 4:
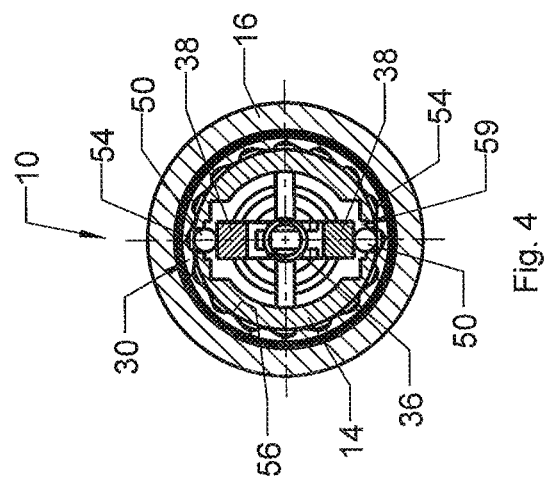
FIG. 4 is a schematic diagram of the cross-section of a release mechanism for a torque tool in the unlocked state according to FIG. 3.

In this exemplary embodiment, the main body 14 is connected to the drive body 16. The main body 14 is pivot-mounted on the drive body 16 so that in an unlocked state, as shown in FIGS. 2 and 4, the main body 14 can rotate freely around a common axis of rotation 32. In the locked state, as shown in FIGS. 1 and 2, the drive body 16 and the main body 14 are coupled to each other. The drive body 16 then drives the main body 14 to transfer a torque to a workpiece.

The lever arrangement 28 comprises a toggle lever arrangement 34, which is preloaded using a spiral spring 36. The toggle lever arrangement 34 in the present exemplary embodiment comprises two axially arranged levers 38, which are connected to each other through two radially arranged levers 40 via hinge joints 42, 44. The lever arrangement 28 itself is flexibly connected through hinge joints 46 to the main body 14 by a hinge base 47. The hinge base 47 in the present exemplary embodiment is formed as a kind of bar, which is provided as an integral part of the main body 14.

When activated, the plunger 26 of the solenoid 24 acts on the center hinge joint 44, which connects the radial levers 40 to each other. On the outer sides 48 of each of the axial levers 38 there are locking elements 50, which are formed as balls 52. The locking elements 50 engage the locking recesses 54 of the drive body 16. The locking recesses 54 are located in the inner surface 56 of the drive body 16.

The spiral spring 36 acts on the central hinge joint 44 on the opposite side 58 of the plunger 26 and thus preloads the lever arrangement 28. The locking elements 50 are pressed into the locking recesses 54 by the axial levers 38 due to the spring force of the spiral spring 36. The locking mechanism 30 of the release mechanism 10 now prevents the main body 14 from rotating freely with respect to the drive body 16 around their common axis of rotation 32. In this locked state, a torque can be transferred from the drive body 16 through the main body 14 to a workpiece.

FIG. 2 shows a cross-section of the release mechanism 10 for a torque tool 12 in the locked state according to FIG. 1. The same reference signs are used in FIG. 2 wherever they correspond to the reference signs used in FIG. 1. This diagram clearly shows how the main body 14 is enclosed in the area of the locking mechanism 30 by the drive body 16. The locking recesses 54 for the locking elements 50 are distributed around the inner surface 56. The locking elements 50 of the locking mechanism 30 are pressed by the axial levers 38 into the locking recesses 54. In this exemplary embodiment, the axial levers 38 are arranged opposite each other. The spiral spring 36 presses against the radial levers 40, as a result of which the axial levers 38 activate the locking elements 50 to lock.

Figure 3:
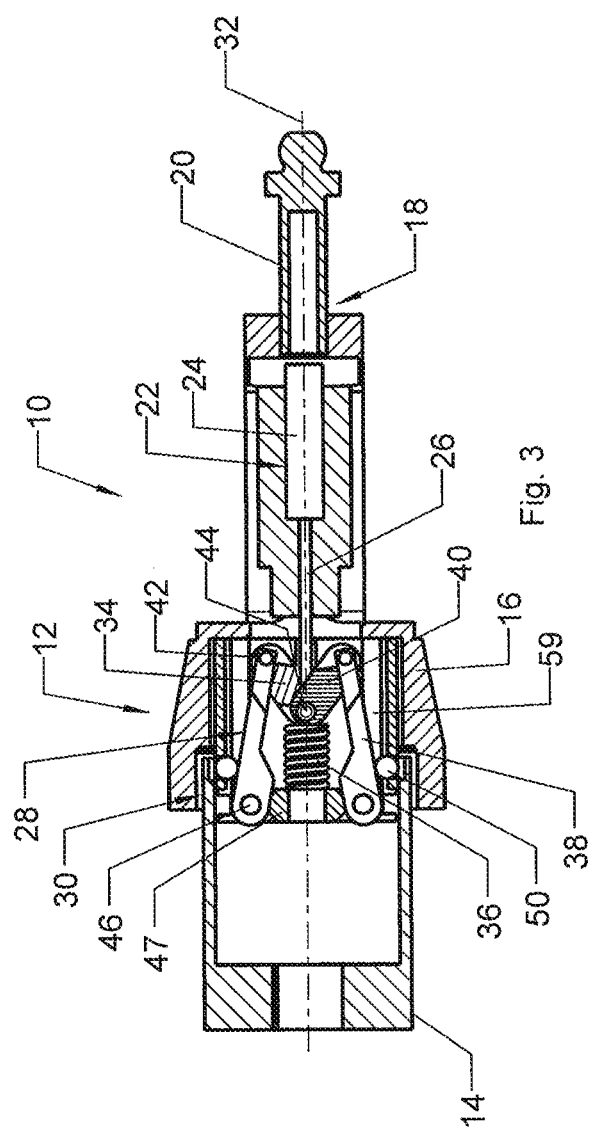
FIG. 3 is a schematic diagram of the longitudinal section along the axis of a release mechanism for a torque tool in the unlocked state according to FIG. 1 and FIG. 2.

FIG. 3 shows the release mechanism 10 of the torque tool 12 corresponding to FIG. 1, although in an unlocked state, in contrast to the state shown in FIGS. 1 and 2. A longitudinal section of the torque tool 12 is shown in this figure. The torque tool 12 comprises the cylindrical main body 14 with the housing-like drive body 16. The drive shaft 20 is attached to an area 18 of the drive body 16. The drive shaft 20 is firmly connected to the drive body.

The solenoid 24 is arranged in the cavity 22 of the drive body 16. The plunger 26 extends out of the solenoid 24. When the solenoid 24 is activated, the plunger 26 acts on the lever arrangement 28 of the locking mechanism 30, which is provided between the main body 14 and the drive body 16.

The end of the main body 14 and the end of the drive body 16 are connected to each other. The main body 14 is pivot-mounted on the drive body 16 so that when the main body 14 is in an unlocked state, as shown here, the main body 14 can rotate freely around the common axis of rotation 32. The drive body 16 does not transfer torque to the main body 14 in this case. The transfer of torque to a workpiece is thus interrupted when the torque tool 12 releases.

The lever arrangement 28 comprises, as described above, the toggle lever arrangement 34, which is preloaded using the spiral spring 36. The spiral spring 36 presses against the hinge base 47 in this case. The toggle lever arrangement 34 comprises the two axially arranged levers 38, which are flexibly connected to each other through two radially arranged levers 40. The lever arrangement 28 itself is flexibly connected by hinge joints 46 to the hinge base 47 of the main body 14.

When activated, the plunger 26 of the solenoid 24 acts on the center hinge joint 44. On the outer sides 48 of each of the axial levers 38 there are locking elements 50.

The spiral spring 36 acts on the central hinge joint 44 on the opposite side 58 of the plunger 26 and thus preloads the lever arrangement 28. When unlocking, as shown in FIG. 3, the plunger 26 of the solenoid 24 is activated, which acts on the center hinge joint 44 against the spring force of the spiral spring 36. This activates the toggle lever arrangement 34 so that the two axial levers 38 move inwards at an angle towards the center hinge joint 44. This creates a free space 59 on each side for the locking elements 50. In this state, the locking elements 50 move out of the locking recesses 54 and into this free space 59. As a result of this, the locking mechanism 30 is unlocked and the main body 14 can rotate freely in the drive body 16. Torque is not transferred anymore in this released state. In particular, the locking elements 50 are not pressed into the locking recesses 54 by the axial levers 38 due to the spring force of the spiral spring 36 anymore. The main body 14 is decoupled from the drive body 16.

FIG. 4 shows a cross-section of the release mechanism 10 for a torque tool 12 in the unlocked state according to FIG. 3. The same reference signs are used in FIG. 4 wherever they correspond to the reference signs used in FIGS. 1 to 3. In the cross-section shown, the main body 14 is enclosed in the area of the locking mechanism 30 by the drive body 16. The locking recesses 54 for the locking elements 50 are distributed around the inner surface 56. The locking elements 50 of the locking mechanism 30 are located in the free space 59. The main body 14 is unlocked and can rotate freely in the drive body 16.

The torque tool 12 is an electronic torque tool and has suitable control electronics with a sensor. A target torque is stored in the control electronics and compared to the current torque applied. The applied torque is measured for this purpose, for example with a strain gauge on a torsion bar. The sensor supplies the value of the applied torque to the control electronics, which acts as a signaling device upon reaching the target torque and controls and activates the solenoid 24 to release the torque tool 12.

FIG. 5 shows another exemplary embodiment of a release mechanism 110 of a torque tool 112. Only an excerpt of a cross-section of the torque tool 112 in the area of the release mechanism 110 in a locked state is shown. This excerpt is from a longitudinal section of the torque tool 112. The torque tool 112 comprises a cylindrical main body 114, which is enclosed by a corresponding housing 116. The housing 116 also forms the drive body 118 to transfer a torque through the main body 114 to a workpiece.

An axial channel 120 is provided in the main body 114. Radial holes 122 for locking elements 124 extend from the axial channel 120. A stop 126, which supports one side of a spring 128, is located in the axial channel 120. A cylindrical plunger 130 with a truncated conical tip 132 is located on the other side of the spring 128. Due to the spring force of the spring 128, the plunger 130 presses against a lever arrangement 134. The lever arrangement 134 comprises two levers 136, which are provided with hinge joints 138 on one end and are flexibly connected to the hinge base 140. The lever arrangement 134 is located in a lever chamber 142. The lever chamber 142 is formed in the area of the levers 136 by a widened section 143 of the axial channel 120. The levers 136 are pushed apart from each other by the truncated conical tip 132 due to the spring 128 to lock in this lever chamber 142.

The radial holes 122 open directly into this lever chamber 142. The levers 136 can selectively cover or expose the radial holes 122. In the locked state, as depicted here in FIGS. 5 and 6, the holes 122 are covered by the levers 136. The locking elements 124 are pressed outwards radially. The locking elements 124 are formed as balls 144. Each of the outermost radial balls 124a is positioned in a locking recess 146. The locking recesses 146 are located on the inner surface 148 of the housing 116. The arrangement described above thus forms a locking mechanism 150.

The release mechanism 110 additionally comprises a solenoid 152 as an electrically operated actuator. The solenoid 152 is also located in the axial channel 120 on the side opposite the spring 128. To release and unlock the locking mechanism 150, the solenoid 152 pushes with a plunger 154 against the truncated conical tip 132 of the cylindrical plunger 130. The levers 136 expose the radial holes 122 and now form together with the lever chamber 142 a free space 156 on each side into which the innermost balls 124b move. The outermost locking elements 124a move inward accordingly in the same direction and release the lock between the main body 114 and the housing 116. The locking elements 124a roll out of the locking recesses 146 to release the lock. The main body 114 can now rotate freely in the housing 116. A torque is not transferred anymore because the main body 114 is decoupled from the drive body 118.

The torque tool 112 in this exemplary embodiment is also an electronic torque tool and has suitable control electronics with a sensor. A target torque is stored in the control electronics and compared to the current torque applied. The applied torque is measured for this purpose, for example with a strain gauge on a torsion bar. The sensor supplies the value of the applied torque to the control electronics, which acts as a signaling device upon reaching the target torque and controls and activates the solenoid 152 to release the torque tool 112.

FIG. 6 shows a cross-section of the release mechanism 110 for a torque tool 112 in the locked state according to FIG. 5. The same reference signs are used in FIG. 6 wherever they correspond to the reference signs used in FIG. 5. This diagram clearly shows how the main body 114 is enclosed in the area of the locking mechanism 150 by the drive body 118. The drive body 118 thus forms the housing 116. The locking recesses 146 for the locking elements 124 are distributed around the inner surface 148 of the housing 116. The locking elements 124 of the locking mechanism 150 are pressed by the levers 136 into the locking recesses 146 by the spring force of the spring 128. The levers 136 are arranged opposite one another. The cylindrical plunger 130 presses the locking elements 124 into the radial holes 122 so that the outermost locking elements 124a couple the main body 114 to the drive body 118. The drive body 118 is thus able to transfer a torque to the main body 114.

Figure 7:
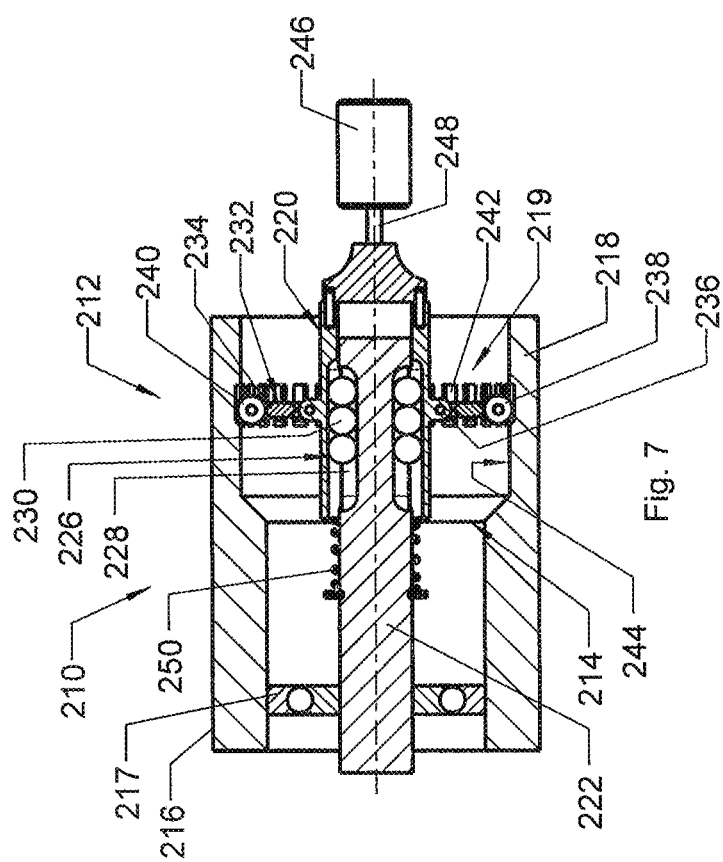
FIG. 7 shows a longitudinal section of a third exemplary embodiment of a release mechanism for a torque tool in the locked state.

FIG. 7 shows another exemplary embodiment of a release mechanism 210 for a torque tool 212 in a locked state. Only an excerpt of a cross-section of the torque tool 212 in the area of the release mechanism 210 is shown. This excerpt is from a longitudinal section of the torque tool 212. The torque tool 212 comprises a cylindrical main body 214, which is enclosed by a corresponding housing 216. The housing 216 also forms the drive body 218 to transfer a torque through the main body 214 to a workpiece. The drive body 218 is coupled to the main body 214 by a locking mechanism 219 for this purpose.

The main body 214 comprises an axial channel 220. A piston 222 is located in the axial channel 220. The piston 222 is supported on one side by the main body 214 and on the other side by a stop ring 217. The piston 222 is provided with an axial ball bearing 226. The ball bearing 226 is formed by recesses 228 in the piston 222 and the ball bearing balls 230.

Figure 10:
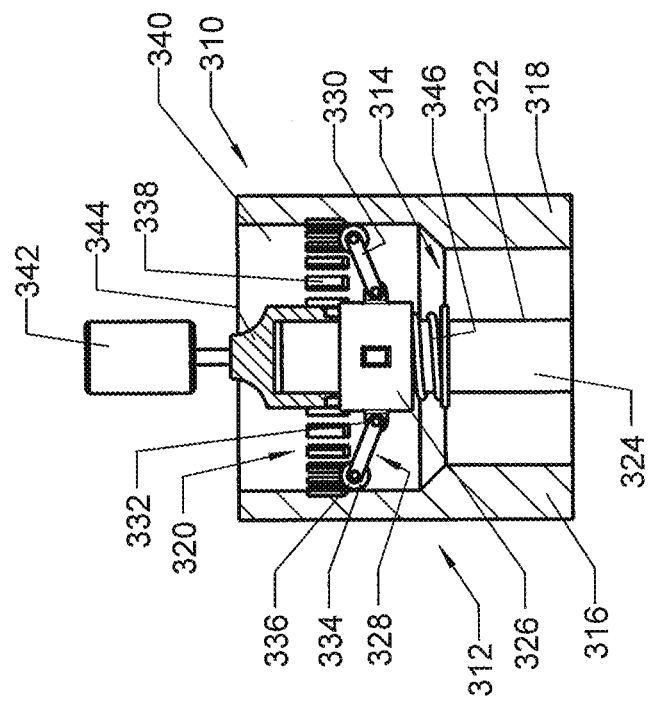
FIG. 10 is a schematic diagram of the longitudinal section along the axis of a release mechanism and according to FIG. 9 for a torque tool in the unlocked state.

Furthermore, a lever arrangement 232 is provided, which is formed by four levers 234 arranged at right angles (see also FIG. 10). The levers 234 are flexibly fastened to the piston 222 by hinge joints 236. Locking elements 238 are provided at the ends of the levers 234. The locking elements 238 comprise small locking wheels 240, which in the locked state are located in locking recesses 242, as shown in the diagram. The locking recesses 242 are located on the inner surface 244 of the housing 216.

A solenoid 246, acting as an electrically operated actuator, pushes the piston 222 with a plunger 248 in the axial direction to unlock. When unlocking, the locking elements 238 are moved out of the locking recesses 242 with the aid of the lever arrangement 232. The main body 214 now moves freely in the housing 216. The drive body 218 is decoupled from the main body 214 so that no torque can be transferred from the drive body 218 to the main body 214 anymore. A piston spring 250 pushes the piston 222 back to its locking position as shown.

This variant of the torque tool 212 is also an electronic torque tool and has suitable control electronics with a sensor. A target torque is stored in the control electronics and compared to the current torque applied. The applied torque is measured for this purpose, for example with a strain gauge on a torsion bar. The sensor supplies the value of the applied torque to the control electronics, which acts as a signaling device upon reaching the target torque and controls and activates the solenoid 246 to release the torque tool 212.

Figure 8:
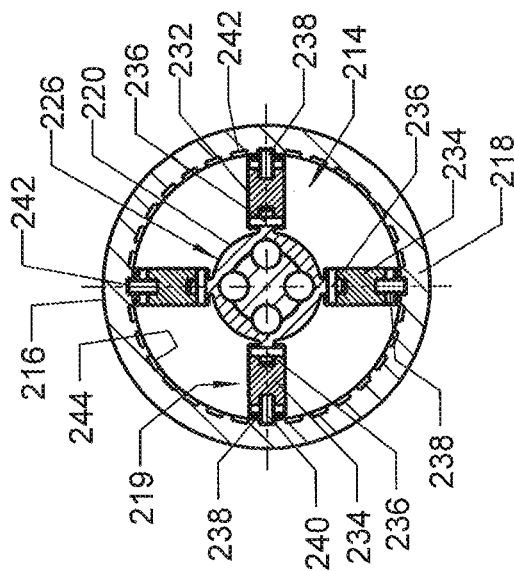
FIG. 8 is a schematic diagram of the cross-section of a release mechanism for a torque tool in the locked state according to FIG. 7.

FIG. 8 shows a cross-section of the release mechanism 210 for a torque tool 212 in the locked state according to FIG. 7. The same reference signs are used in FIG. 8 wherever they correspond to the reference signs used in FIG. 7. This diagram clearly shows how the main body 214 is enclosed in the area of the locking mechanism 219 by the drive body 218. The drive body 218 thus forms the housing 216. The locking recesses 242 for the locking elements 238 are distributed around the inner surface 244 of the housing 216. The locking elements 238 of the locking mechanism 219 are pressed by the levers 234, which form the lever arrangement 232, into the locking recesses 242 by the spring force of the piston spring 250. The levers 234 are arranged radially at 90° angles. As long as the main body 214 is coupled to the drive body 218 via the lever arrangement 232, torques can be transferred. Due to decoupling when released, the main body 214 rotates freely in the drive body 218.

Figure 9:
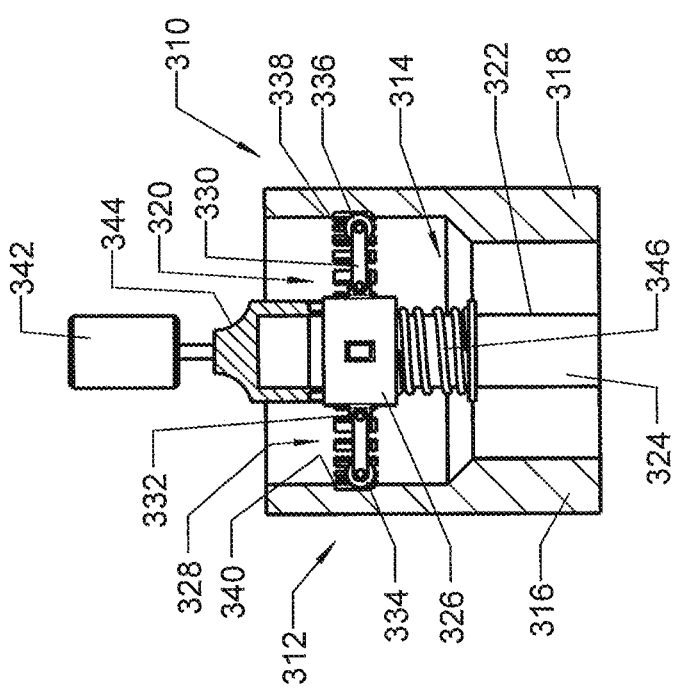
FIG. 9 shows a longitudinal section of a fourth exemplary embodiment of a release mechanism for a torque tool in the locked state.

FIG. 9 shows another exemplary embodiment of a release mechanism 310 for a torque tool 312 in a locked state. Only an excerpt of a cross-section of the torque tool 312 in the area of the release mechanism 310 is shown. This excerpt is from a longitudinal section of the torque tool 312. The torque tool 312 comprises a cylindrical main body 314, which is enclosed by a corresponding housing 316. The housing 316 also forms the drive body 318 to transfer a torque through the main body 314 to a workpiece. The drive body 318 is coupled to the main body 314 by a locking mechanism 320 for this purpose.

The main body 314 comprises an axial channel 322. A shaft 324 is located in the axial channel 322. The shaft 324 is firmly anchored in the main body 314. A ring body 326 is located on the shaft 324. The ring body 326 is provided slidably on the shaft 324. A lever arrangement 328 is provided on the ring body 326. The lever arrangement 328 comprises levers 330, which are provided pivotably in the axial direction on the ring body 326 with hinge joints 332.

Locking elements 334 are provided at the ends of the levers 330. The locking elements 334 comprise small locking wheels 336, which in the locked state are located in locking recesses 338, as shown in the diagram. The locking recesses 338 are located on the inner surface 340 of the housing 316. A pan-like cylinder 344 is provided a solenoid 342, which is used as an electrically operated actuator. The pan-like cylinder 344 has a diameter approximately equal to the diameter of the shaft 324. A spring 346 is located between the main body 314 and the ring body 326. The ring body 326 is preloaded by a spring force between the pan-like cylinder 344 and the spring 346.

In the locked state, as depicted in FIG. 9, the drive body 318 drives the shaft 324, and thus drives the main body 314. In the locked state, the lever arrangement 328 couples the drive body 318 to the shaft 324 anchored in the main body 314.

FIG. 10 shows the release mechanism 310 according to FIG. 9, but this time in an unlocked state. Wherever the components in the two figures correspond, the same reference signs are used. As soon as the torque tool should release when reaching a target torque, the solenoid 342 pushes the ring body 326 in an axial direction with the pan-like cylinder 344 to unlock. When unlocking, the locking elements 334 are moved out of the locking recesses 338 with the aid of the lever arrangement 328. The main body 314 now moves freely in the housing 316. The drive body 318 is decoupled from the main body 314 so that no torque can be transferred from the drive body 318 to the main body 314 anymore.

This variant of the torque tool 312 is also an electronic torque tool and, like the exemplary embodiments described before, has suitable control electronics with a sensor. A target torque is stored in the control electronics and compared to the current torque applied. The applied torque is measured for this purpose, for example with a strain gauge on a torsion bar. The sensor supplies the value of the applied torque to the control electronics, which acts as a signaling device upon reaching the target torque and controls and activates the solenoid 342 to release the torque tool 312.

Figure 11:
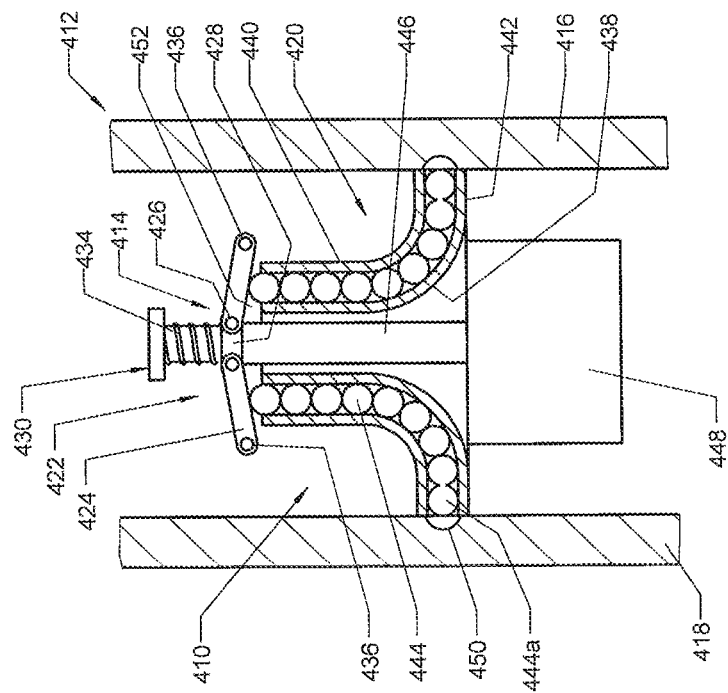
FIG. 11 shows a longitudinal section of a fifth exemplary embodiment of a release mechanism for a torque tool in the locked state.

FIG. 11 shows a schematic diagram of another exemplary embodiment of a release mechanism 410 for a torque tool 112. Only an excerpt of a cross-section of the torque tool 412 in the area of the release mechanism 410 is shown. The release mechanism 410 with a locking mechanism 414 is shown in the locked state in this figure. The number 416 refers to a housing of the torque tool. The housing 416 in this exemplary embodiment also forms a drive body 418 to transfer a torque to a main body 420. The main body 420 contains the locking mechanism 414. This locking mechanism 414 comprises a lever arrangement 422. The lever arrangement 422 comprises two approximately radial levers 424, which are arranged to pivot around hinge joints 426. The hinge joints 426 are located on the outer ends of a central and movable bar 428. A punch-like body 430, on whose shaft 432 a spring 434 preloads the bar 428, is provided on the bar 428.

A hinge joint 436 is also located on the other ends of each of the levers 424. The drawing shows a curved deflection tube 438 below each of the levers 424. This deflection tube curves at a 90° angle, transitioning from an axial direction 440 to a radial direction 442. There are locking elements 444 in the curved deflection tube 438. The locking elements 444 are balls.

A plunger 446 of a solenoid 448, as an electrically operated actuator, pushes against the bar 428. In the locked state of the release mechanism 410, the locking elements 444 of the levers 424 are pressed into the deflection tubes 438. Each of the outermost locking elements 444a is moved into a locking recess 450 to lock, as shown in FIG. 11. In the locked state, the drive body 418 and the main body 420 always rotate around the same axis of rotation to transfer a torque.

This variant of the torque tool 412 is also an electronic torque tool and, like the exemplary embodiments described before, has suitable control electronics with a sensor. A target torque is stored in the control electronics and compared to the current torque applied. The applied torque is measured for this purpose, for example with a strain gauge on a torsion bar. The sensor supplies the value of the applied torque to the control electronics, which acts as a signaling device upon reaching the target torque and controls and activates the solenoid 448 to release the torque tool 412.

Figure 12:
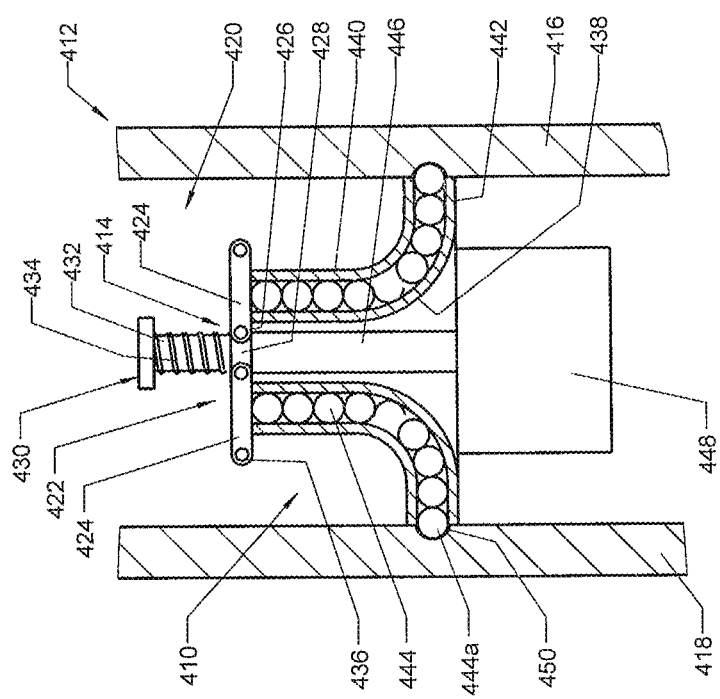
FIG. 12 is a schematic diagram of the longitudinal section along the axis of a release mechanism and according to FIG. 11 for a torque tool in the unlocked state.

FIG. 12 shows a schematic diagram of the exemplary embodiment according to FIG. 11 of a release mechanism 410 for a torque tool 412. The release mechanism 410 with a locking mechanism 414 is shown in the locked state in this figure. The same reference signs are used in FIG. 12 wherever they correspond to the reference signs used in FIG. 11.

The housing 416 forms the drive body 418 to transfer a torque to the main body 420. The main body 420 contains the locking mechanism 414. This locking mechanism 414 comprises a lever arrangement 422. The lever arrangement 422 comprises two approximately radial levers 424, which are arranged to pivot around hinge joints 426. The hinge joints 426 are located on the central and movable bar 428 with the punch-like body 430. Due to the spring 434, the bar 428 is preloaded by a spring force.

The plunger 446 of the solenoid 448 presses against the bar 428 when the torque tool 412 is released. In the unlocked state of the release mechanism 410 shown, the levers 424 are moved away from the ends of the curved deflection tubes 438. As a result of this, a free space 452 is formed into which locking elements 444 can move. The locking recess 450 is empty due to this movement. The main body 420 and the drive body 418 are not coupled to each other anymore. In this released and unlocked state, the drive body 418 therefore cannot transfer torque to the main body 420. The main body 420 can now rotate freely in the housing 416.

LIST OF REFERENCE SIGNS

10 Release mechanism
12 Torque tool
14 Main body
16 Drive body
18 Area of the drive body
20 Drive shaft
22 Cavity of the drive body
24 Solenoid
26 Plunger of the solenoid
28 Lever arrangement
30 Locking mechanism
32 Axis of rotation
34 Toggle lever arrangement
36 Spiral spring
38 Axial lever
40 Radial lever
42 Hinge joint
44 Center hinge joint
46 Hinge joints
47 Hinge base
48 Outer side of the axial lever
50 Locking elements
52 Balls
54 Locking recesses
56 Inner surface
58 Opposite side
59 Free space
110 Release mechanism
112 Torque tool
114 Main body
116 Housing
118 Drive body
120 Axial channel
122 Radial hole
124 Locking elements
124a Outermost balls
124b Innermost balls
126 Stop
128 Spring
130 Cylindrical plunger
132 Truncated conical tip
134 Lever arrangement
136 Levers
138 Hinge joints
140 Hinge base
142 Lever chamber
143 Widened section
144 Balls
146 Locking recesses
148 Inner surface of the housing
150 Locking mechanism
152 Solenoid
154 Plunger of the solenoid
156 Free space
210 Release mechanism
212 Torque tool
214 Main body
216 Housing
217 Stop ring
218 Drive body
219 Locking mechanism
220 Axial channel
222 Piston
226 Ball bearing
228 Recesses
230 Balls of the ball bearing
232 Lever arrangement
234 Levers
236 Hinge joints
238 Locking elements
240 Locking wheels
242 Locking recesses
244 Inner surface of the housing
246 Solenoid
248 Plunger
250 Piston spring
310 Release mechanism
312 Torque tool
314 Main body
316 Housing
318 Drive body
320 Locking mechanism
322 Axial channel
324 Shaft
326 Ring body
328 Lever arrangement
330 Levers
332 Hinge joints
334 Locking elements
336 Locking wheels
338 Locking recesses
340 Inner surface of the housing
342 Solenoid
344 Pan-like cylinder
346 Spring
410 Release mechanism
412 Torque tool 414 Locking mechanism
416 Housing
418 Drive body
420 Main body
422 Lever arrangement
424 Levers
426 Hinge joints
428 Bar
430 Punch-like body
432 Shaft
434 Spring
436 Hinge joint
438 Curved deflection tube
440 Axial direction
442 Radial direction
444,444a Locking element
446 Plunger
448 Solenoid
450 Locking recess
452 Free space

The invention claimed is:

1. A release mechanism (10, 110, 210, 310, 410) for an electronically triggered torque tool (12, 112, 212, 312, 412) for tightening screws and similar fasteners which triggers at a target torque, comprising:
a drive body (16, 118, 218, 318, 418) and a main body (14, 114, 214, 314, 420) which rotate around a common axis to transfer a torque;
a locking mechanism (30, 150, 219, 320, 414) which couples the drive body (16, 118, 218, 318, 418) and the main body (14, 114, 214, 314, 420) to transfer the torque;
a sensor to measure and evaluate the torque transferred;
a signaling device which activates the locking mechanism (30, 150, 219, 320, 414) to decouple the drive body (16, 118, 218, 318, 418) from the main body (14, 114, 214, 314, 420) upon reaching a target torque; and
an electrically operated actuator (24, 152, 246, 342, 448) which unlocks the locking mechanism (30, 150, 219, 320, 414) upon reaching the target torque,
wherein the locking mechanism (30, 150, 219, 320, 414) has a spring-loaded lever arrangement (28, 134, 232, 328, 422) arranged at least partially within the drive body,
wherein the lever arrangement (28, 134, 232, 328, 422) couples the drive body (16, 118, 218, 318, 418) to the main body (14, 114, 214, 314, 420) to transfer the torque and, when released, unlocks the main body (14, 114, 214, 314, 420) from the drive body (16, 118, 218, 318, 418),
wherein the lever arrangement (28, 134, 232, 328, 422) of the locking mechanism (30, 150, 219, 320, 414) acts on a locking element (50, 124, 238, 334, 444), which engages a recess (54, 146, 242, 338, 450) in the drive body (16, 118, 218, 318, 418) to lock, and which moves out of the recess (54, 146, 242, 338, 450) to unlock, and
wherein the locking element (50, 124, 238, 334, 444) is provided in a deflection tube (438), which is curved at an angle of 90° in the main body (14, 114, 214, 314, 420) and which transitions from an axial direction (440) to a radial direction (442).

2. The release mechanism (10, 110, 210, 310, 410) as in claim 1, wherein the lever arrangement (28) is formed as a spring-loaded toggle lever arrangement (34).

3. The release mechanism as in claim 1,
wherein the sensor is a strain gauge and that is operatively connected to a control electronics.

4. The release mechanism as in claim 1,
wherein the lever arrangement comprises two levers (424),
wherein each of the two levers (424) is pivotally supported by a respective hinge joint (436), and
wherein the two levers (424) are jointly connected to the electrically operated actuator (24, 152, 246, 342, 448).

5. The release mechanism as in claim 1,
wherein the locking element (50, 124, 238, 334, 444) comprises
a plurality of balls (50, 124, 238, 334, 444) and
wherein the lever arrangement (28, 134, 232, 328, 422) comprises a lever which is in direct contact with at least one of the plurality of balls.

* * * * *